United States Patent
Bretin (10) Patent No.: US 8,484,285 B2
(45) Date of Patent: Jul. 9, 2013

(54) METHOD AND DEVICE FOR COMMUNICATION BETWEEN A DEVICE AND A SERVER

(75) Inventor: Simon Bretin, Labége Cedex (FR)

(73) Assignee: Sierra Wireless Solutions and Services, Labege (FR)

( * ) Notice: Subject to any disclaimer, the term of this patent is extended or adjusted under 35 U.S.C. 154(b) by 0 days.

(21) Appl. No.: 12/282,950

(22) PCT Filed: Mar. 15, 2007

(86) PCT No.: PCT/FR2007/000453
§ 371 (c)(1),
(2), (4) Date: Apr. 21, 2009

(87) PCT Pub. No.: WO2007/104868
PCT Pub. Date: Sep. 20, 2007

(65) Prior Publication Data
US 2009/0216344 A1    Aug. 27, 2009

(30) Foreign Application Priority Data

Mar. 15, 2006  (FR) ...................................... 06/02286
Mar. 15, 2006  (FR) ...................................... 06/02287

(51) Int. Cl.
*G06F 15/16* (2006.01)
*G06F 12/00* (2006.01)

(52) U.S. Cl.
USPC ......................................... 709/203; 709/224

(58) Field of Classification Search
USPC .................................. 709/203, 223–229, 250
See application file for complete search history.

(56) References Cited

U.S. PATENT DOCUMENTS

| 6,640,140 | B1 | 10/2003 | Lindner et al. |
| 7,228,129 | B1 * | 6/2007 | Ward et al. .................... 455/423 |
| 7,249,172 | B2 | 7/2007 | Ollive et al. |
| 2003/0208297 | A1 | 11/2003 | Stawikowski et al. |
| 2005/0125547 | A1 * | 6/2005 | Ahonen ........................ 709/228 |
| 2006/0053447 | A1 * | 3/2006 | Krzyzanowski et al. ....... 725/40 |
| 2007/0015498 | A1 * | 1/2007 | Giacalone et al. ............. 455/418 |
| 2008/0027679 | A1 * | 1/2008 | Shklarski ..................... 702/182 |

FOREIGN PATENT DOCUMENTS

| EP | 1 139 636 A2 | 10/2001 |
| EP | 1 310 847 A1 | 5/2003 |
| EP | 1 492 309 A2 | 12/2004 |
| FR | 2 881 594 A1 | 8/2006 |
| WO | 2006/088947 A2 | 8/2006 |

\* cited by examiner

*Primary Examiner* — Zarni Maung
(74) *Attorney, Agent, or Firm* — Young & Thompson (57) ABSTRACT

A device for communicating between an electronic module (110) equipped with a programmable controller and a remote server (140), includes:
- an element for associating the electronic module with a device (100) in such a way that the module receives signals representative of statuses or operational parameters of the device via at least one connector (103),
- a communications server application on the electronic module, the communications server application being designed to communicate automatically with the device and also with the remote server via a communications element (120, 125) and
- a communications server application on the remote server for adapting it to communicate automatically with the electronic module via at least one communications channel via at least one communications element (155, 160).

8 Claims, 3 Drawing Sheets

METHOD AND DEVICE FOR COMMUNICATION BETWEEN A DEVICE AND A SERVER

This invention concerns a process and a device programming communications between a device and a server by means of a communications module and a process for programming such a device. It applies, in particular, to controlling and commanding, remotely, office, home or industrial devices, and vehicles or buildings. Traditionally, these devices are not equipped with interfaces for communicating with remote elements (Ethernet or Wi-Fi type) but instead with communication buses (Serial, RS485, etc) and inputs/outputs allowing communication with elements close to the device.

In the field of remotely controlling and commanding a device, generally a monitoring operator makes a regular maintenance visit to check that the device is working properly and, if there is a fault, alert a technical department. This process presents a number of drawbacks. Firstly, it can take a significant time to detect a fault and, secondly, the quality of the technical department's maintenance operation is dependent on the quality of the report transmitted by the monitoring operator.

In systems that are more automated, it is known for the device to be equipped with a remote communications module that monitors the device's status and that, when thresholds are exceeded, triggers an alarm on a remote terminal, for example by sending a mini-message, known under the name SMS (for short message system), to a maintenance manager's mobile telephone. These systems present a number of drawbacks. Firstly, they do not allow a group of devices to be managed centrally. Secondly, they are dependent on the alarm's communications network being available. Further, they require the intervention of qualified IT staff for their programming. Finally, they cannot be reprogrammed remotely.

The aim of the present invention is to remedy these drawbacks.

To this end, according to a first aspect, the present invention envisages a device for communicating between an electronic module equipped with a programmable controller and a remote server, characterized in that it comprises:
- a means of associating said electronic module with a device in such a way that said module receives signals representative of statuses or operational parameters of said device by means of at least one connector,
- a communications server application on said electronic module, said communications server application being designed to communicate automatically with said device and also with said remote server by means of a communications means and
- a communications server application on said remote server for adapting it to communicate automatically with said electronic module by means of at least one communications channel by means of at least one communications means;

each of said server applications being designed:
- to decide to transmit a request to the other application server, according to a predefined criterion, said remote server and said module thus being designed to transmit a request to said module or said remote server, respectively, following said decision and
- on reception of said request, to transmit a response to the other server application, said module and said remote server thus being designed to transmit to said remote server or said module, respectively, said response encapsulating information representative of said statuses or parameters of said device.

Thanks to these provisions, each of the two server applications can interrogate the other and, in return, obtain instructions or status information.

According to particular features, at least one of said server applications comprises a means of automatically selecting a communications channel between the electronic module and said remote server, according to the characteristics of the data to be transmitted and the communications channels available, at least one of the steps of transmitting a request and the response to said request being carried out utilizing the selected communications channel.

According to particular features, at least one of said applications comprises a means of conserving the data to be transmitted while a full request/response cycle has not been successfully completed.

According to particular features, one of the means of communication is a GSM/GPRS type of wireless network.

According to a second aspect, the present invention envisages a process for communications between an electronic module and a remote server, characterized in that it comprises:
- a step of associating said electronic module equipped with a programmable controller with a device in such a way that said module receives signals representative of statuses or operational parameters of said device by means of at least one connector;
- a step of installing a communications server application on said electronic module, said communications server application being designed to communicate automatically with said device and also with said remote server by means of a communications means;
- a step of installing a communications server application on said remote server for adapting it to communicate automatically with said electronic module by means of at least one communications channel by means of at least one communications means;
- a step of transmitting a request from said remote server and said module to said module or said remote server, respectively, following an automatic decision to use an available communications means and
- on reception of said request, a step of transmitting a response, from said module or said remote server to said remote server or said module, respectively, said response encapsulating information representative of said statuses or parameters of said device.

According to particular features, the process as described in brief above comprises a step of automatically selecting a communications channel between the electronic module and said remote server, according to the characteristics of the data to be transmitted and the communications channels available, at least one of the steps of transmitting a request and the response to said request being carried out utilizing the selected communications channel.

According to particular features, the process as described in brief above comprises a step of conserving the data to be transmitted while a full request/response cycle has not been successfully completed, in order to be able to again send said data by means of one of the other communications means.

According to particular features, one of the means of communication is a GSM/GPRS type of wireless network.

According to a third aspect, the present invention envisages a process for developing a machine-to-machine application between a communications module intended to be associated to a device and a computer system, characterized in that it comprises:
- a step of defining logical data for an application intended to be run on the communications module, the logical data being a representation of the functions offered by the device,
- a step of matching each logical datum to at least one means of acquisition or command with respect to this datum, thus enabling the effective handling of the data,
- a step of defining configuration parameters for the communications module that enable its interface with the device, parameterizing the communications means and defining other parameters specific to the communications module chosen during the selection step,
- a step of defining the communication between the module and the computer system,
- a step of generating the application intended to be run on the module, this generation being specific to the parameter settings and data previously performed or defined and
- a step of downloading the application onto the module.

According to particular features, the process that is the subject of the third aspect comprises, in addition, a step of selecting a type of communications module, for example by means of its brand name and its model, the generation of the application intended to be run on the module being, in addition, specific to the choice of module type.

According to particular features, the process that is the subject of the third aspect comprises, in addition, a step of defining an event-driven logic allowing the logical data to interact with each other, the generation of the application intended to be run on the module being, in addition, specific to the event-driven logic defined.

According to particular features, the process that is the subject of the third aspect comprises, in addition:
- a step of defining logical data for an application intended to be run on the computer system,
- a step of matching each logical datum to at least one means of storage of the computer system,
- a step of defining the event-driven logic allowing the logical data of the computer system's application to interact,
- a step of configuring parameters of the computer system,
- a step of generating the application intended to be run on the computer system, this generation being specific to the parameter settings, choice and logics previously performed or defined and
- a step of downloading the application onto the computer system.

According to particular features, during at least one step of defining logical data, logical devices operated by an application are defined and then logic variables representative of their logical characteristics are added to them.

According to particular features, during at least one step of defining logical data, an editor is utilized that allows logical devices to be created, modified or deleted, without reference to their electronic realization, by defining its variables by means of parameters, this definition of variables and parameters being restricted by means of the editor through compatibility with the type of communications module chosen during the selection step.

According to particular features, with said editor the logical data are defined by means of graphical screens guiding the user by, for certain parameters, proposing choices to them specific to the type of communications module chosen and, for other parameters, leaving them free.

According to particular features, at least one of the steps of matching and defining communications is performed by means of graphical interfaces restricting the user with respect to the type of communications module used.

According to particular features, during at least one matching step, an editor is utilized that allows each variable defined during the logical data definition step to be associated with a means of acquisition, control or storage, this editor limiting the choices according to parameters, variables and functions offered by the type of communications module that is programmed.

According to particular features, at least one step of defining event-driven logic is performed graphically by selecting the logical data to be controlled, by associating a binary logic concept and by choosing an action to be executed from among a plurality of actions, the logical data to be controlled, the binary logic relationships and the actions to be executed being represented by specific graphical elements.

According to particular features, during the step defining the communications between the module and the computer system, if at least two communications channels have been defined, the dynamic choice of communications channel to be used is defined according to the possible statuses of each other communications channel.

According to particular features, the process that is the subject of the third aspect does not require code to be written in computer language and solely consists of manipulating graphical interfaces.

Other advantages, aims and characteristics of the present invention will become apparent from the description that will follow, made, as an example that is in no way limiting, with reference to the drawings included in an appendix, in which.

Figure 1:
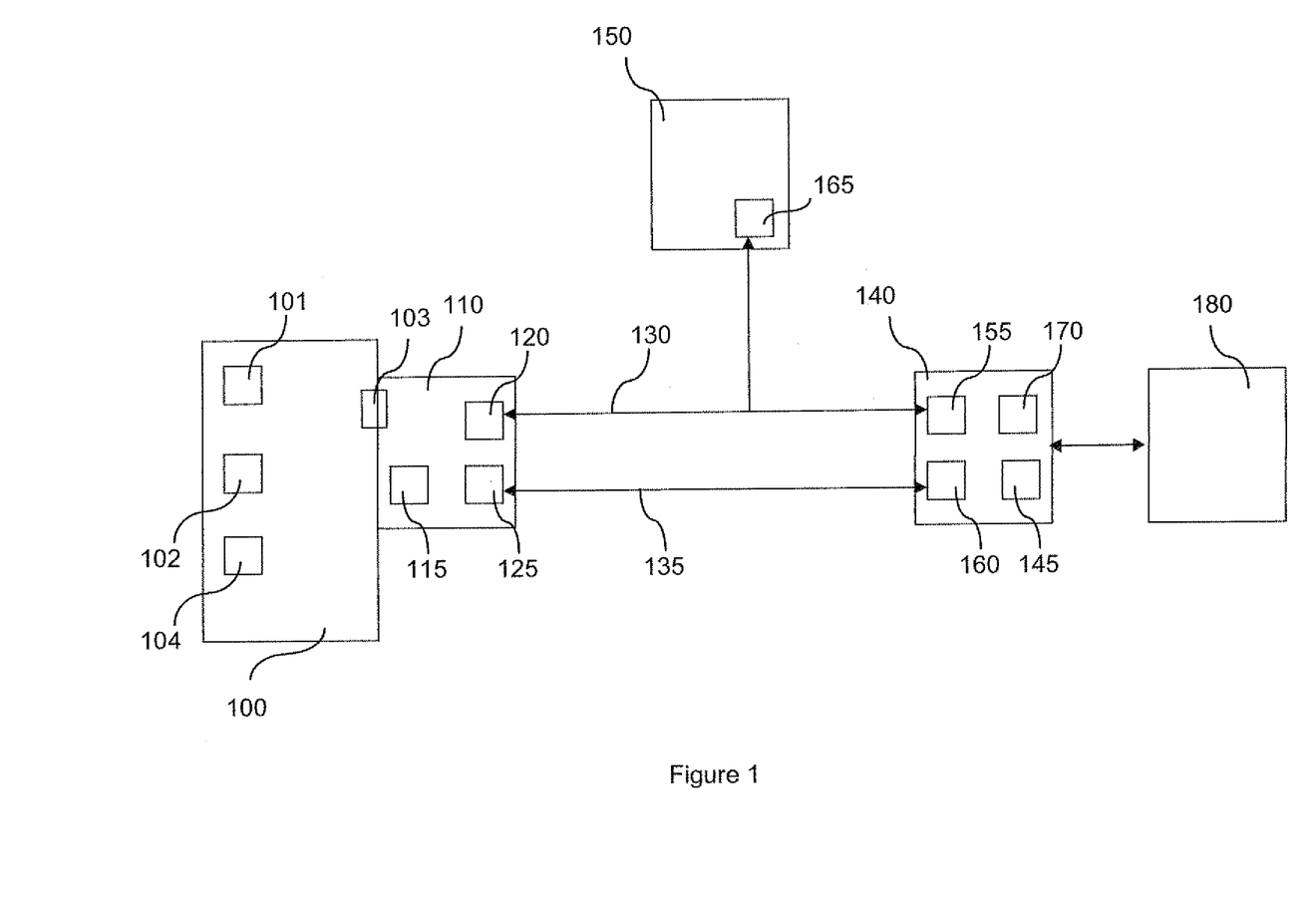
FIG. 1 represents, schematically, an implementation of a particular embodiment of the device that is the subject of this invention.

FIG. 1 shows a device to be monitored 100, a communications module 110 associated to the device 100 and comprising a controller 115 and, for preference, at least two communications means 120 and 125, two communications channels 130 and 135, an operations server 140, comprising two communications means 155 and 160, a controller 170 and a means of storing data 145, a programming terminal 150 comprising a communications means 165 and a client terminal 180. The communications module 110 is, for example, a Q2686 module from Wavecom (registered trademarks) or a TC65 from Siemens (registered trademarks).

The device to be monitored 100 can be fixed such as, for example, a boiler, an office device or an electronic display panel, or mobile such as, for example, a vehicle. These devices are generally numerous and we talk in terms of a fleet of devices that we wish to monitor or control. For preference, the device 100 comprises a controller 101 and utilizes software, in particular for controlling the status of sensors 102 and/or actuators 104 and for communicating by means of at least one connector 103.

The communications module 110 is designed to receive, by means of the connector 103, data from the device 100 and especially signals representing statuses or operating parameters of said device 100.

The communications module 110 is also designed to send commands to the device 100, by means of the connector 103.

In addition, the communications means 120 and 125 allow the communications module 110 to communicate, by means of the two communications channels 130 and 135, with the server 140 and, possibly, with the programming terminal 150, given that another channel (not shown) can be used for communications between the communications module 110 and the programming terminal 150. The communications channels 130 and 135 are, for example, wireless telephone networks, for example of type GSM and GPRS, respectively.

The communications module 110 is designed to download software by means of one, at least, of networks 130 and 135 from the server 140 and/or programming terminal 150, under external control, such as a third-party software system or an SMS.

The server 140 is of known type and is designed to interrogate each module 110, to receive its responses, to aggregate the data received and to trigger instructions or alarms, according to the data received or the aggregated data. The server 140 is also designed to provide data to client terminals by operating as a web server.

The programming terminal 150 is designed to program applications for each module 110 and applications for each server 140. The programming terminal 150 utilizes a development suite detailed later in the description.

Figure 2:
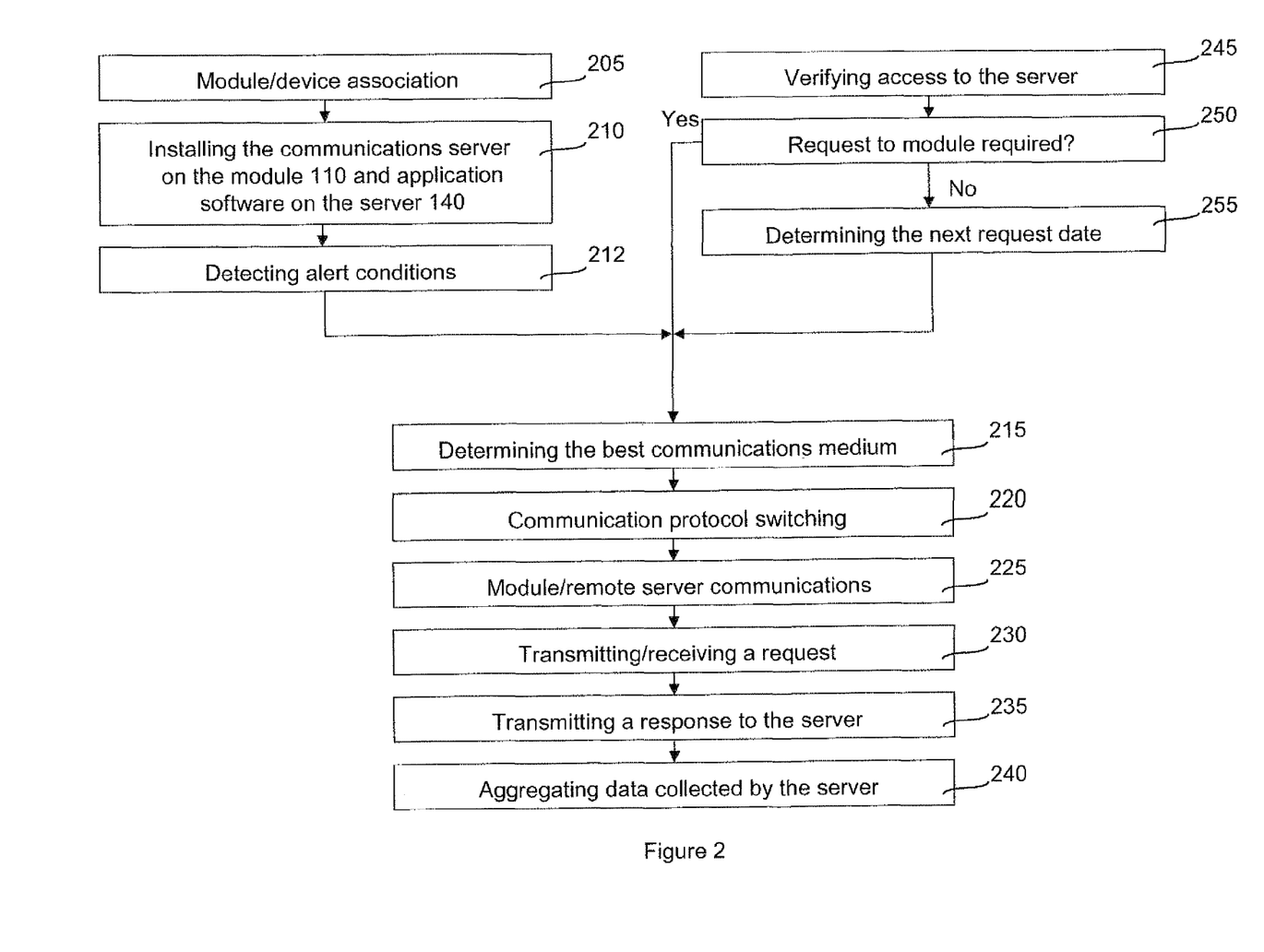
FIG. 2 represents, in the form of a flowchart, a particular embodiment of the process that is the subject of the present invention
Figure 3:
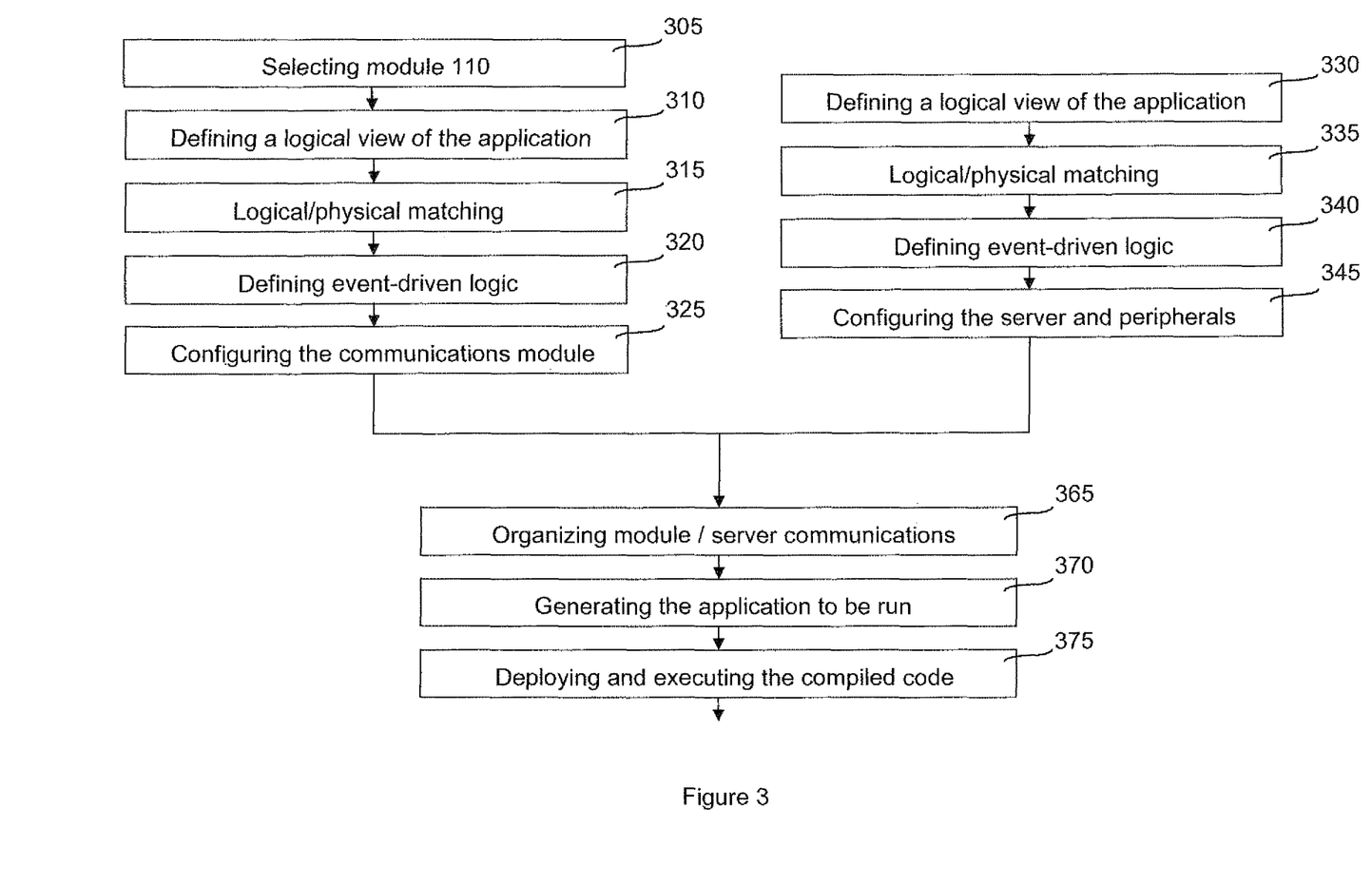
FIG. 3 represents, in the form of a flowchart, a particular embodiment of a process programming the device that is the subject of the present invention.

The communications module 110 and the server 140 and, more precisely, the controllers 115 and 170 are designed to utilize, between them, the communications process that is the subject of the present invention, as presented with reference to the logic diagram of FIG. 2, after a programming phase illustrated in FIG. 3.

The client terminal 180, of any type whatsoever, mobile telephone, personal digital assistant, personal computer or network server, for example, allows a user, or operator, to access the data storage means 145 kept by the server 140 and, in particular, to the data concerning each of the modules 110, possibly after authentication. In this communication, the server 140 operates as a web server to allow access to the data with an interface well known to all users, i.e. a web browser.

FIG. 2 shows a step 205 of associating, according to known techniques, the communications module 110 equipped with a programmable controller 115 with said device 100 in such a way that said communications module 110 receives signals representative of statuses or operational parameters of said device 100.

Then, during a step 210, a communications server application, similar in type to that of the web server, is installed on the communications module 110. For example, the installed server is programmed in Java (registered trademark) and is very small in size. It is noted that this installed server, characteristic of the present invention, allows the remote control and monitoring of the module 110 and the associated device 100. It will be noted furthermore that this communications module 110 is not designed to receive off-the-shelf components available to the person in the field (typically the web servers traditionally available on installed devices) as a result of the major constraints imposed by the communications modules. From step 210, the communications module 110 operates as a communications server, for example a web server. It is recalled that a communications server comprises a software system that responds to requests from clients, for example with communications means known as http (acronym for hypertext transfer protocol) or mini-messages, known under the name SMS (acronym for Short Message System). It is noted that, for preference, the communications module 110 does not supply pages; it supplies data which the server 140 will integrate into pages that it will supply to the clients 180. This data can be supplied, for example, as SMS.

Communication between the module 110 and the server 140 can be triggered under various circumstances:

if trigger events are detected by the module 110, for example according to thresholds applied to sensors associated to the device 100, step 212, according to a pre-defined schedule of communications between the module 110 and the server 140, where this schedule can be managed by the module 110 or by the server 140 (case illustrated in FIG. 2, in step 255), according to requests transmitted by the client terminal 180, in the case where the data kept in the database 145 may be considered obsolete with regard to the request received, steps 250.

During a step 215, the server that wishes to initiate a communication with the other server, i.e. either the communications server of module 110, or the server 140, determines the best medium for communications between the communications module 110 and the server 140. During this step 215, the following criteria may be considered in particular, in descending order of priority: the availability of the communications channels, the transmission urgency of the data flow to be transmitted, the pricing of the operators handling the various communications channels.

Thanks to this step, the communications capacity between the communications module 110 and the server 140 is practically ensured, even if one of the channels is not available.

Depending on the communications channel selected during step 215, during step 220 the corresponding communication protocol switching is performed, where necessary.

Then, during a step 225, the communications module 110 and said remote server 140 are connected, for example by utilizing the hypertext transfer protocol http.

Then, during a step 230, the server initiating the communication transmits a request to the recipient, which receives it, for example by utilizing the hypertext transfer protocol http. For preference, for each request received, the communications module 110 or the server 140 checks, for security reasons, during step 230, the address of the server issuing the request.

During a step 235, the recipient analyses the request received, retrieves the required data, especially from the device 100 or the data storage means 145, processes this data and sends a response to the initiator of the request. This response thus encapsulates in particular data representative of statuses or parameters of the device 100 or communications module 110.

For the description of steps 230 and 235, the case considered is that in which the server 140 initiates the communication. In the other case, in which it is the communications server of the communications module 110 that initiates the communication, step 230 does not take place and, during step 235, the communications module 110 retrieves the data to be transmitted, especially from the device 100, processes this data and sends a message to the server 140. This response thus encapsulates data representative of statuses or parameters of the device 100 or communications module 110.

During a step 240, the server 140 aggregates and distributes the data collected from the various communications modules 110 to the people, client terminals, databases and computer applications concerned. The aggregation can comprise the building up of a status history of the devices 100 associated to the electronic modules 110 and the triggering of an alert in the case of a breakdown, or a need for preventive maintenance, for example a need to supply consumables. These alerts are determined according to data representative of statuses or parameters of the device 100 received during the step 235 or aggregated during the step 240.

When a request arrives at the server 140 from a client terminal 180, a database or an application, during a step 245, a check is carried out to verify that the issuer of this request is authorized to issue it, according to known techniques. It is noted that the request issued by the client terminal 180 is a request issued by a browser, the server 140 then acting as a web server.

Then, during a step 250, it is determined whether a request to the device 110 is required, according to the request received and the length of time elapsed since the last update of data concerning this module and at least one configuration parameter of the server.

In this way, the reading the memory of the device's module or the memory of the device is avoided if there is data that is sufficiently recent, for example in the case of a request concerning data where the value and possible changes are known. For example, it may be sufficient to refresh the toner level status each week.

If the result of step 250 is positive, a request to the device 100 being necessary, you go to step 215. Otherwise you go to step 255, during which the next due time of a request to be sent to the device 100 is determined, the data required by the user is read in the database 145 and/or an extrapolation is carried out of the recent data stored in the database and the client terminal 180 is supplied with the data required by the client terminal, in the form of a web page.

In response to the requests that it receives, the server 140 aggregates data coming from databases and dynamic physical data transmitted by the electronic modules 110, in order, for example, to define client files that it transmits to the issuer of the request received during step 245.

During a step 255, the next date of a request to be sent to the communications module is determined and when this date arrives, you pass to step 212. For preference, the length of time considered as sufficient between two updates is customizable.

FIG. 3 shows the utilization of a process for developing software quickly and easily in order to develop, generate and install machine-to-machine applications and to program, connect and manage distant devices 100 from one or more application servers 140.

The process is utilized in a powerful graphical development environment in order to develop, generate and install machine-to-machine applications much more rapidly than with a traditional development approach and without knowledge of programming languages. In this way development costs are minimized and productivity is maximized.

During an optional step 305, the communications module 110 that is going to be programmed is selected, it being understood that physical interfacing of this module with a device 100 has been carried out beforehand, for example, or during its physical installation.

During a step 310, a logical data model is defined for the application destined to be run on the communications module 110. This model is realized by defining logic devices operated by the application, then by adding variables to them representing their logical characteristics. This definition is done by means of a graphical screen guiding the user by proposing choices to them for certain parameters and, for other parameters, leaving them free. This logical data model is completely independent of the physical acquisition of actual existing data. For example, a centralized alarm station will be represented by a logical device "CentralAlarm" with its logical variables "Status" (a boolean representing the alarm's on or off status) and "AlarmOn" (a boolean representing the triggering or not of the alarm).

An editor is utilized that allows logical devices to be created, modified and deleted (without reference to its electronic realization) by defining its variables, by means of parameters such as data type (character string, numeric or boolean), access mode (writing and/or reading), variation limits (maximum and minimum value or length).

This definition of variables and parameters is restricted through compatibility with the functions offered by the editor. For example, the data type can be limited to the three data examples below and therefore a table is not allowed.

During a step 315, a "Mapping" or matching is carried out so that each logical variable of the application's logical data model can be acquired (reading) and/or controlled (writing) on physical or logical media. In addition, this configuration is performed by means of graphical interfaces restricting the user with respect to the physical reality of the communications module 110 used.

An editor is utilized that allows each logical variable defined during the step 310 to be associated with an acquisition or control means supported by the environment. This editor limits the choice according to the parameters of the logical variables defined previously and functions offered by the module 110 that is programmed.

For example, the centralized alarm station's logical variable "Status" can be associated to the GPIO (General Purpose Input Output) pin no. 4 of the communications module, the user not being able to choose pins 0 to 3 since these do not exist on the module used. Thus, in this case, an association is constituted that is specific to the communications module and the devices concerned by the programming.

During a step 320, the event-driven logic is defined, i.e. the operation of the computer application and the conditions of carrying out its actions. For example, this event-driven logic indicates which combinations of the device's statuses cause which actions on the part of the associated communications module. This definition is performed graphically by selecting the logical data to be controlled (represented, for example, by rectangles), by associating a binary logic concept (represented, for example, by relationships between the rectangles previously selected) and finally by choosing an action to be executed from among those available (represented by icons). In this way, the logical data to be controlled, the binary logic relationships and the actions to be executed are for preference represented by specific graphical elements.

During a step 325, the configuration parameters of the communications module 110 are defined that will allow its interface with the device 100, as well as the proper operation of the communications modules 110 itself.

This configuration is performed by means of graphical interfaces restricting the user with respect to the physical realities of the components of the communications module 110. For example, the communication speed of an existing serial port on the module can be configured.

During steps 330 to 345, the same steps are carried out as steps 310 to 325, respectively, for programming the communications application to be installed on the server side considered preselected as it is common to various modules 110.

Thus, during step 330, a logical data model is defined for the application destined to be run on the server 140. This model is realized by defining logic software and hardware operated by the application, then by adding variables to them representing their logical characteristics. This definition is done by means of a graphical screen guiding the user by proposing choices to them for certain parameters and, for other parameters, leaving them free. This logical data model is completely independent of the physical processing or storage of actual existing data. This definition of variables and parameters is restricted through compatibility with the functions offered by the editor.

During a step 335, a "Mapping" or matching is carried out so that each variable of the application's logical data model can be acquired (reading) and/or controlled (writing) on physical or logical media. In addition, this configuration is performed by means of graphical interfaces restricting the user with respect to the physical reality of the server 140 and its peripherals used.

An editor is utilized that allows each variable defined during the step 330 to be associated with an acquisition or control means supported by the environment. This editor limits the choices according to the parameters of the variables defined previously and the functions offered by the server 140 that is programmed. Thus, in this case, an association is constituted that is specific to the server 140 and its peripherals concerned by the programming.

During a step 340, the event-driven logic is defined, i.e. the operation of the computer application and the conditions of carrying out its actions. For example, this event-driven logic indicates which combinations of statuses cause which actions on the part of the server 140 or its peripherals. This definition is performed graphically by selecting the logical data to be controlled (represented by rectangles), by associating a binary logic concept (represented by relationships between the rectangles previously selected) and finally by choosing an action to be executed from among those available (represented by icons).

During a step 345, the configuration parameters of the server 140 and its peripherals are defined that will allow its interface with the module 110.

This configuration is performed by means of graphical interfaces restricting the user with respect to the physical realities of the server 140 and its peripherals. For example, the communication speed of an existing serial port on the server can be configured.

Then, during a step 365, the communications between the module and the server are defined. An editor is utilized that allows the communications means to be selected according to the communication capabilities offered by the communications module 110.

If at least two communications channels have been defined, the step 365 also makes it possible to organize the dynamic choice of communications channel to be used. This organization aims to retain a link between the communications module and the server, even if a communications means should be faulty.

For example, the choice depends on the channels available and/or the prices of the communications channels. During this step, the choices are made graphically thanks in particular to multiple-choice boxes, text fields and interfaces refreshed according to choices made previously.

Then, during a step 370, the application that will be executed on the module 110 and the one that will be executed on the server 140 are generated. This application is an assembly of generic software components or bricks, for example the communications server, web server, or specifically generated by the device described.

The software components and bricks are selected according to the choices made previously, in a determinist way. These choices made previously also constrain the execution order of these bricks or components, which ensures that the generated application operates properly.

For example, the bricks concern, firstly, the communications server, web server or SMS server, secondly, GPRS communications, etc.

The generated application intended to be executed on the communications module 110 is generated in its native language.

During a step 375, each of the applications is downloaded onto the module or server and its applications are run, with or without re-initialization.

The main advantages of this development process are the following:

1/ its ease of use:
   a graphical programming approach guides the user's development choices;
   a high-level programming approach:
      using efficient data model bricks for defining the application logic and linking it to a communications device;
      using a device associating the application's physical and logical parameters (means of acquisition);
      providing a configuration wizard for defining all the parameters for communications between the module 110 and the server 140;
   automatic computer code generation;
   a set of ready-to-use application components:
      an installed web server;
      a library of application protocols (Modbus, Nmea, for example) for easy interconnection with specific devices such as PLC (acronym for Programmable Logic Controller), telemetry device, GPS (acronym for Global Positioning System) modules, for example;
      a "standard" web server allowing access to the application information of the developed application;
      application models, presentation pages, graphical components (known under the name widgets).

2/ An end-to-end connection for developing and deploying a complete machine-to-machine solution from the remote devices through to the application servers, allowing communications by means of networks, for example GSM (acronym for Global System for Mobile communication), GPRS (acronym for Global Packet Radio Service), Edge, Wifi (acronym for Wireless Fidelity), LAN (Local Area Network).

3/ Security by means of integrated security mechanisms: utilization of the secure data transfer protocol https, devices for authenticating people, terminals or applications, and user profile management;

4/ Performance levels thanks to:
   the optimization of installed codes for a minimum call on resources, in particular memory resources, electronic resources, and maximum reliability and
   the optimization of the band-width used on the communications networks, by compressing data in order to minimize the costs of data traffic between the electronic modules 110 and the servers 140;

5/ Maintenance and updates: supply, diagnosis, maintenance and downloading of applications remotely, thanks to remote communications capabilities provided by the module 110 and 6/ Retrieval of data from the remote electronic modules 110 for storage in the data processing system (server 140), in order to produce reports, invoices, knowledge bases, for example.

Through utilization of this development environment, a global centralized solution is developed. Practically, the development suite organizes the development and is distinct from the form of execution. A graphical macro-language means that knowledge of computer language is not necessary.

It is noted that the elements and programming are kept in the memory of the programming terminal 150 and can be edited and downloaded remotely on the module 110 and/or the server 140 at any time.

The graphical macro-language and the graphical environment thus use both generic parts and special parts for specific modules. Thanks to these characteristics, the programming language is independent of the communications module and its supplier, the BSPs (acronym for Board Support Package) or MSPs (module support package) or the set of pilots allowing them to be controlled.

The invention claimed is:

1. A device for communicating between an electronic module equipped with a programmable controller and a remote server, characterized in that it comprises:
   a means of associating said electronic module with a device in such a way that said module receives signals representative of statuses or operational parameters of said device by means of at least one connector,
   a communications server application on said electronic module, said communications server application being designed to communicate automatically with said device and also with said remote server by means of a communications means and
   a communications server application on said remote server for adapting it to communicate automatically with said electronic module by means of at least one communications channel by means of at least one communications means;
each of said server applications being designed:
   to decide to transmit a request to the other application server, according to a predefined criterion, said remote server and said module thus being designed to transmit a request to said module or said remote server, respectively, following said decision and
   on reception of said request, to transmit a response to the other server application, said module and said remote server thus being designed to transmit to said remote server or said module, respectively, said response encapsulating information representative of said statuses or parameters of said device.

2. A device according to claim 1, wherein at least one of said server applications comprises a means of automatically selecting a communications channel between the electronic module and said remote server, according to the characteristics of the data to be transmitted and the communications channels available, at least one of the steps of transmitting a request and the response to said request being carried out utilizing the selected communications channel.

3. A device according to claim 1, wherein at least one of said applications comprises a means of conserving the data to be transmitted while a full request/response cycle has not been successfully completed.

4. A device according to claim 1, wherein one of the means of communication is a GSM/GPRS type of wireless network.

5. A process for communications between an electronic module and a remote server, characterized in that it comprises:
   a step of associating said electronic module equipped with a programmable controller with a device in such a way that said module receives signals representative of statuses or operational parameters of said device by means of at least one connector;
   a step of installing a communications server application on said electronic module, said communications server application being designed to communicate automatically with said device and also with said remote server by means of a communications means;
   a step of installing a communications server application on said remote server for adapting it to communicate automatically with said electronic module by means of at least one communications channel by means of at least one communications means;
   a step of transmitting a request from said remote server and said module to said module or said remote server, respectively, following an automatic decision to use an available communications means and
   on reception of said request, a step of transmitting a response, from said module or said remote server to said remote server or said module, respectively, said response encapsulating information representative of said statuses or parameters of said device.

6. A process according to claim 5, that comprises a step of automatically selecting a communications channel between the electronic module and said remote server, according to the characteristics of the data to be transmitted and the communications channels available, at least one of the steps of transmitting a request and the response to said request being carried out utilizing the selected communications channel.

7. A process according to claim 5, that comprises a step of conserving the data to be transmitted while a full request/response cycle has not been successfully completed, in order to be able to again send said data by means of one of the other communications means.

8. A process according to claim 5, wherein one of the means of communication is a GSM/GPRS type of wireless network.

* * * * *

UNITED STATES PATENT AND TRADEMARK OFFICE
CERTIFICATE OF CORRECTION

PATENT NO.       : 8,484,285 B2
APPLICATION NO. : 12/282950
DATED            : July 9, 2013
INVENTOR(S)      : Simon Bretin Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 191 days.

Signed and Sealed this
Eighth Day of September, 2015

Michelle K. Lee
*Director of the United States Patent and Trademark Office*